United States Patent [19]
Anthon

[11] 3,981,562
[45] Sept. 21, 1976

[54] SPATIAL FILTERING FOR ERROR DETECTION

[75] Inventor: Erik W. Anthon, Santa Rosa, Calif.

[73] Assignee: Optical Coating Laboratory, Inc., Santa Rosa, Calif.

[22] Filed: Sept. 9, 1974

[21] Appl. No.: 504,498

[52] U.S. Cl. .......................... 350/162 SF; 356/71; 356/239
[51] Int. Cl.² ........................................ G02B 27/38
[58] Field of Search ................ 350/162 SF; 356/71, 356/237, 239

[56] References Cited
UNITED STATES PATENTS

| | | | |
|---|---|---|---|
| 3,305,834 | 2/1967 | Cooper et al. | 350/162 SF |
| 3,614,232 | 10/1971 | Mathisen | 356/237 |
| 3,633,998 | 1/1972 | Bourrouilh | 350/162 SF |
| 3,658,420 | 4/1972 | Axelrod | 356/237 |
| 3,743,423 | 7/1973 | Heinz et al. | 350/162 SF |
| 3,813,173 | 5/1974 | Teter | 356/239 |

OTHER PUBLICATIONS

Watkins, *Proc. of the IEEE*, vol. 57, No. 9, Sept. 1969, pp. 1634–1639.

*Primary Examiner*—Ronald J. Stern
*Attorney, Agent, or Firm*—Flehr, Hohbach, Test, Albritton & Herbert

[57] ABSTRACT

Fourier transform imaging microscope for examining parts carrying repetitive stripe pattern having a source of light with means forming a slit through which the light passes. Means including the part carrying the repetitive stripe pattern is used for forming a Fourier transform image of the slit after the light beam passes through it. Slit means is provided for suppressing the image of the stripe pattern itself while enhancing any defects and non-uniformities in the pattern.

29 Claims, 22 Drawing Figures

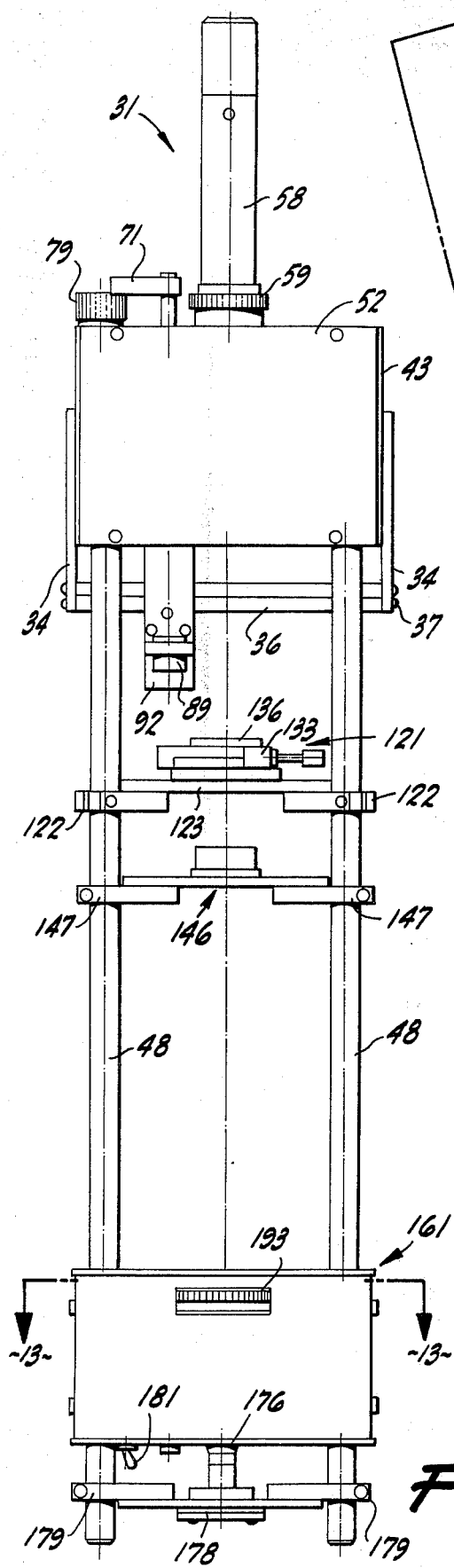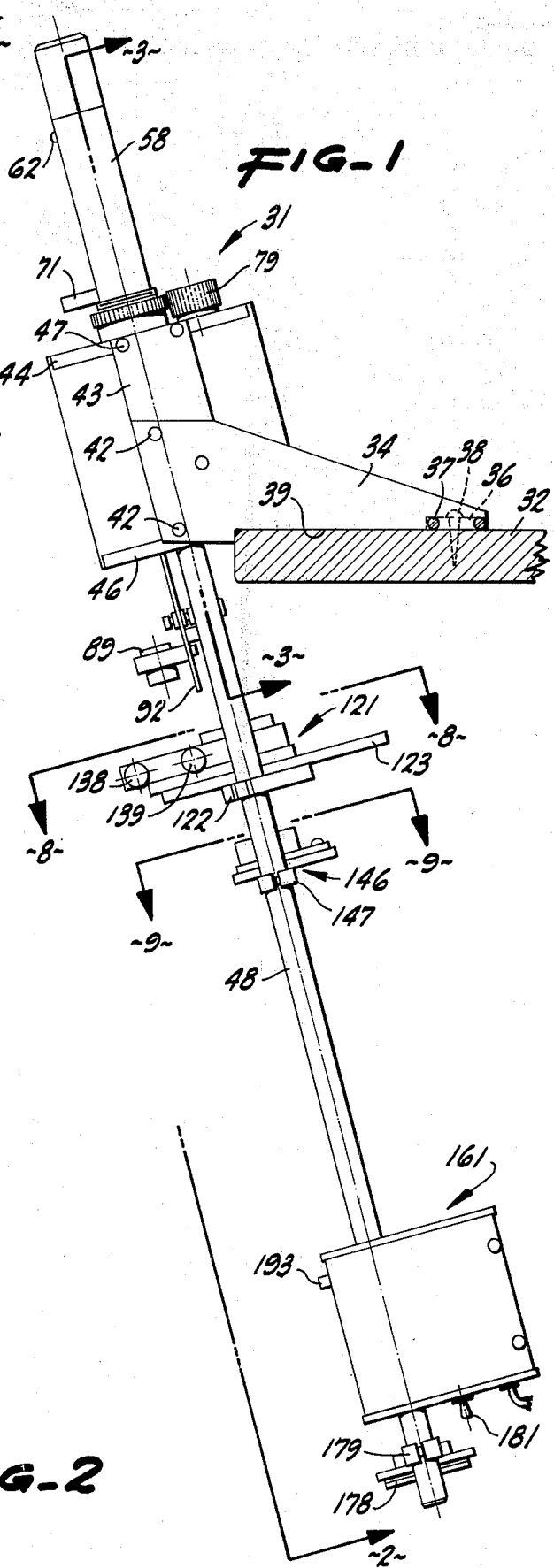
FIG-1
FIG-2

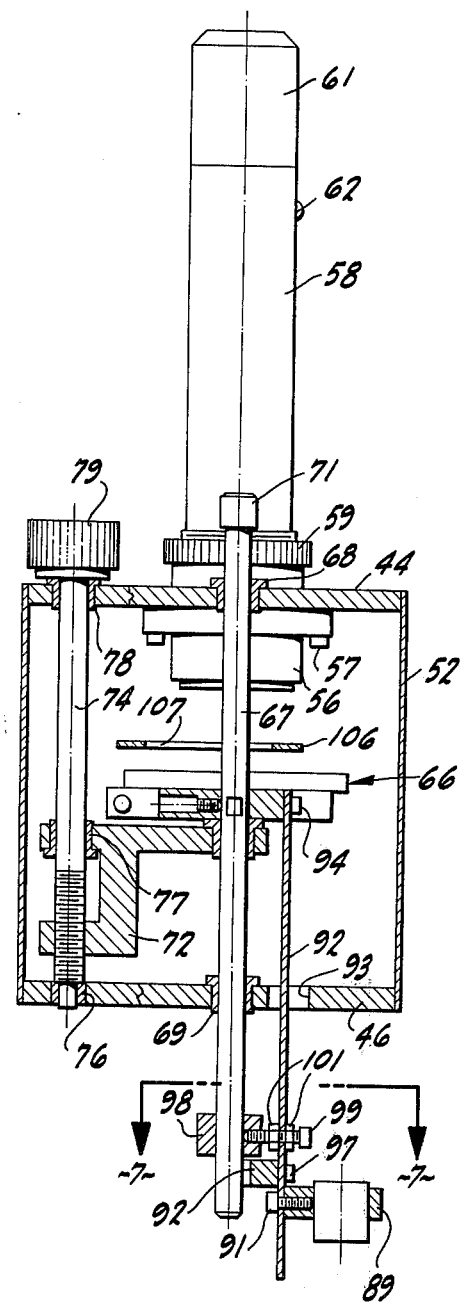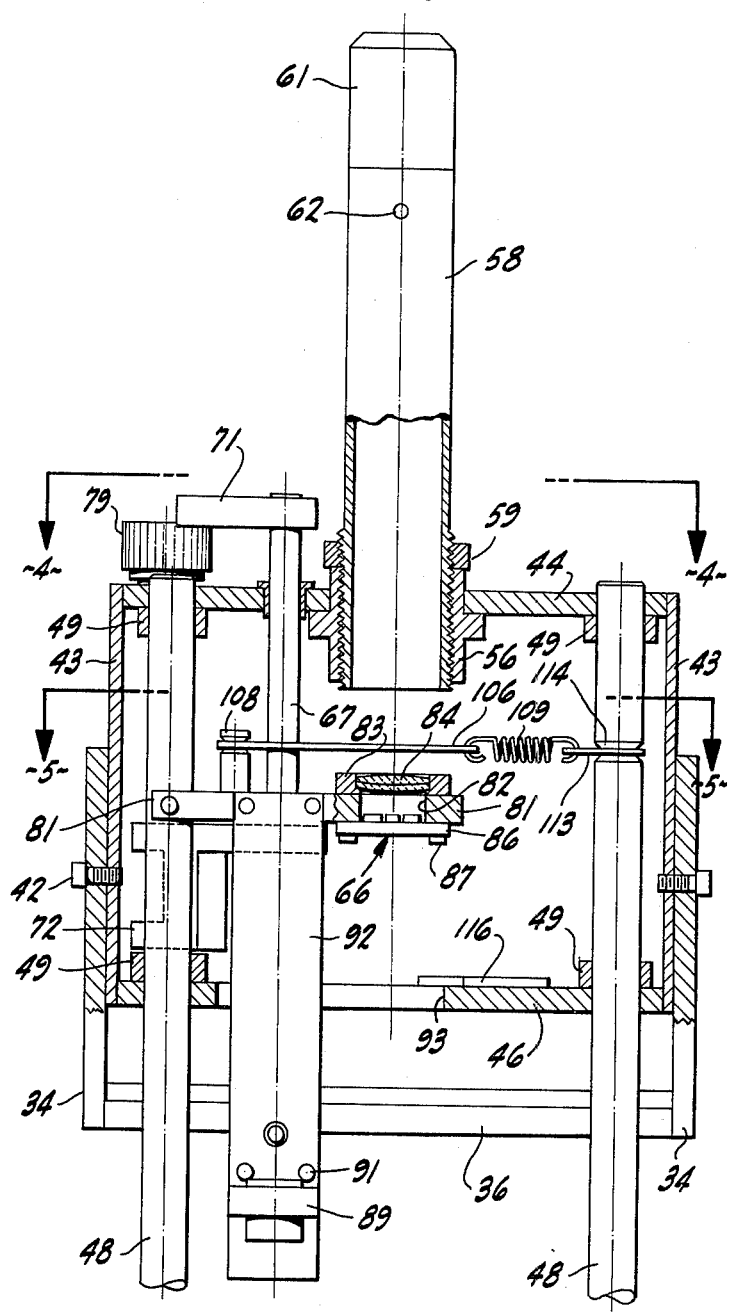

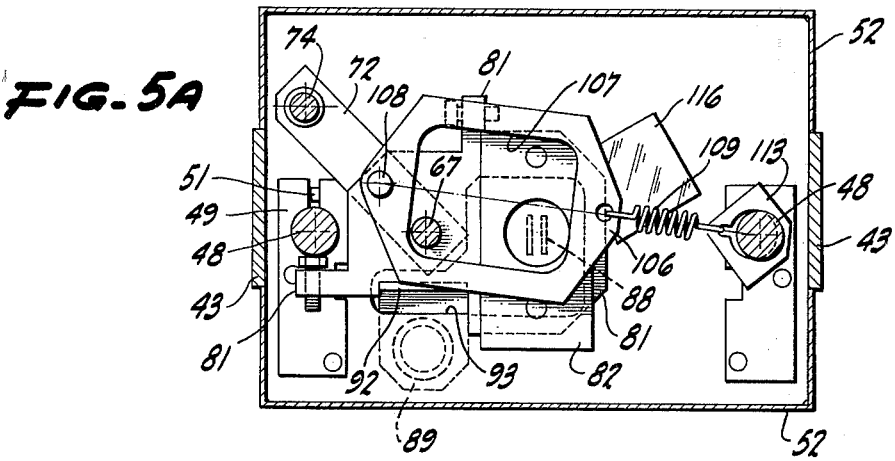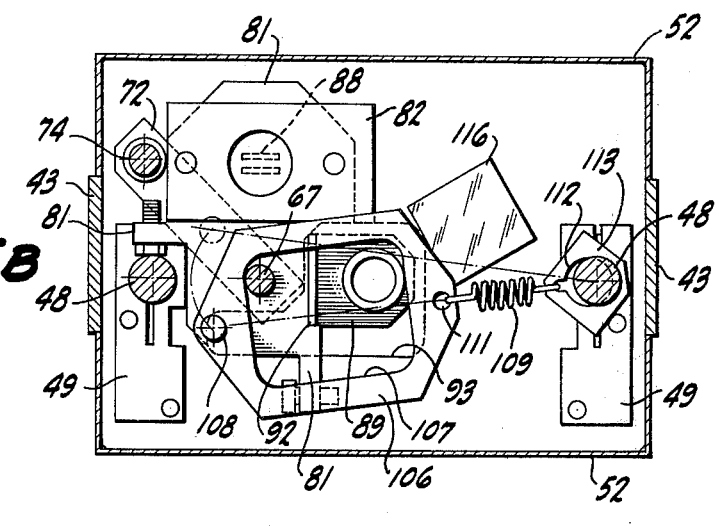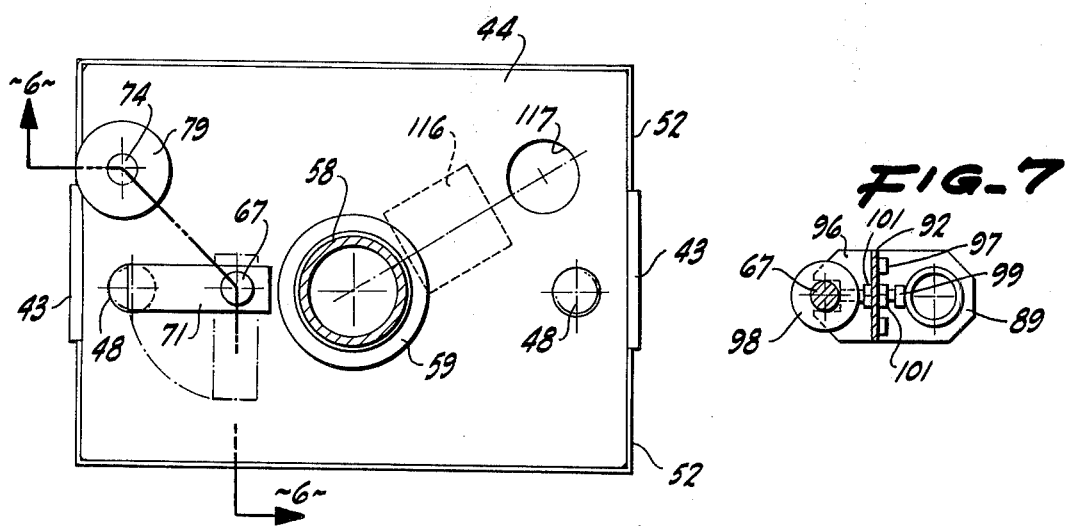

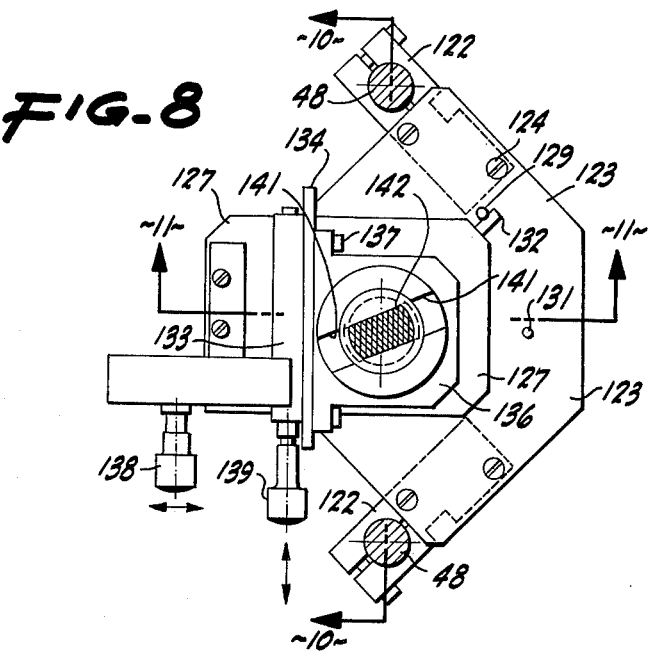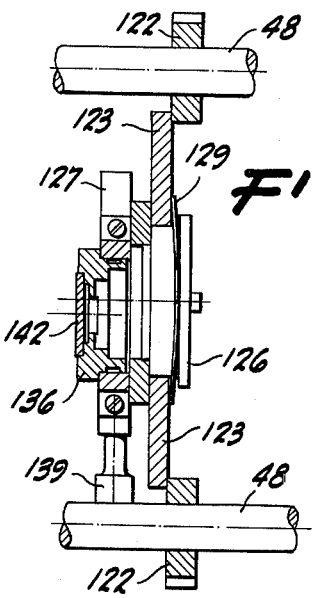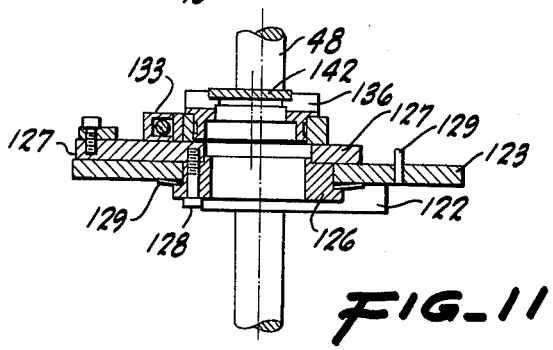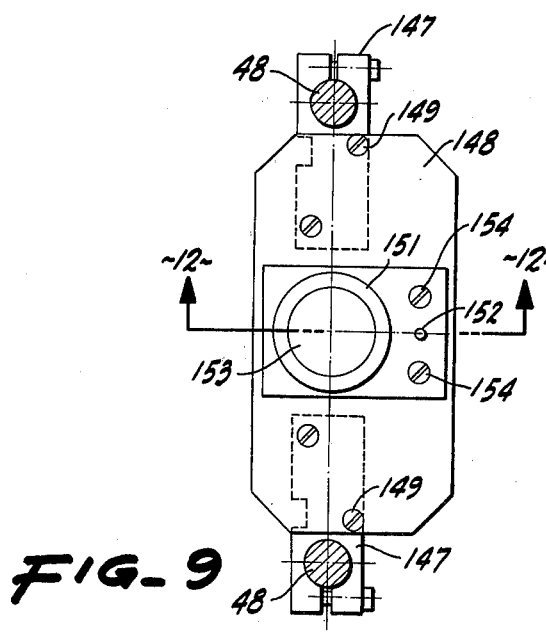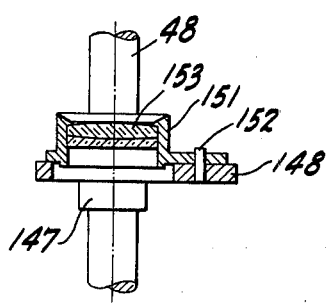

SPATIAL FILTERING FOR ERROR DETECTION

BACKGROUND OF THE INVENTION

Filters with colored stripes are used in certain color television cameras. The filters are generally small, i.e., less than 25 mm diameter and the stripes closely spaced, in the order of 10 to 40 stripes per millimeter. The colored stripes are typically produced as thin film dichroic coatings, that is coatings that transmit one part of the visible spectral range and reflect the rest. Two or three sets of colored stripes of different colors may be used on a filter. The different sets of stripes may be either parallel interspersed or may be crossing each other at some given angle. Cross striped dichroic filters are described in U.S. Pat. No. 3,771,857 and interspersed parallel striped filters are described in pending application Ser. No. 305,692, filed on Nov. 13, 1972. It has been found that such striped filters must be made with a high degree of accuracy to perform satisfactorily in a color television camera. The stripes must be very accurate and uniform in geometry and colorimetry and virtually free from flaws to produce perfect television pictures. The striped filter is placed right at an image plane in the color television camera, but the image created by the stripe pattern is electronically removed from the signal so that the stripes themselves will not show on the television screen. Any irregularities and flaws in the stripe pattern will, however, clearly show up on the screen and are, therefore, very objectionable.

The striped filters are frequently built right into the image tube, normally of the vidicon type, in the color television camera. It is, therefore, necessary to inspect the filters carefully before committing them to become an integral part of expensive image tubes. It has been found to be very difficult and time consuming to adequately inspect the striped filters by any conventional optical methods such as microscopy and magnifying by projection because the very dominant visual image of the colored stripes tends to obscure any flaws in the pattern and because the allowable irregularities in geometry and colorimetry are too small to readily be observed by visual means.

SUMMARY OF THE INVENTION AND OBJECTS

Fourier transform imaging is particularly suited for examination of parts with repetitive patterns such as the striped filters. Fourier transform imaging is normally performed with coherent light from laser beams and requires the use of high resolution lenses and accurate alignment of the parts. The present invention takes advantage of the special diffraction characteristics of the stripe patterns in a way that avoids the need for coherent light, makes possible the use of simple lenses and reduces the requirement for accurate alignment. Monochromatic light with a bandwidth of 10 to 20 nanometers with a wavelength that can be varied through the whole visible range such as can be obtained with a simple filter, grating or prism monochromator is used rather than coherent laser light. The monochromatic light which emerges from the monochromator slit is by a simple lens directed through the striped filter to form the Fourier transform image consisting of a multiple diffraction image of the monochromator slit. The filter is viewed with a low power microscope through one or two slits in a mask placed at the Fourier transform image. The magnification of the microscope is kept low enough to place the whole filter or at least a substantial part of its active area within the field of view. The slits through which the filter is viewed are positioned in the Fourier transform image such that the stripe pattern itself is subdued while defects and irregularities in the stripe pattern are enhanced. This is accomplished by placing the slits in areas of the Fourier transform image where the diffraction effect of the stripe pattern produces minimum energy and by blocking the areas of the Fourier transform image where the diffraction effect of the stripe pattern produces maximum energy.

In general, it is an object of the present invention to provide a Fourier transform imaging microscope and method which can be utilized for examining parts carrying a repetitive stripe pattern to ascertain distributed and local defects in the pattern.

Another object of the invention is to provide a microscope and method of the above character in which the stripe pattern is suppressed and the defects in the striped pattern are enhanced.

Another object of the invention is to provide a microscope and method of the above character in which the stripe pattern is suppressed and the defects are enhanced by utilization of at least one slit which is positioned in the Fourier transform image in a location in which there is low energy of the striped pattern.

Another object of the invention is to provide a microscope and method of the above character in which at least one slit is positioned in an even order of the Fourier transform image.

Another object of the invention is to provide a microscope and method of the above character in which at least one slit is positioned between the orders of the image.

Another object of the invention is to provide a microscope and method of the above character in which at least one slit is positioned at the location of the second order image.

Another object of the invention is to provide a microscopic and method of the above character which can be readily utilized and which is relatively simple to operate.

Another object of the invention is to provide a microscope and method of the above character which is particularly useful in analyzing striped dichroic filters for use on vidicon tubes.

Additional objects and features of the invention will appear from the following description in which the preferred embodiment is set forth in detail in conjunction with the accompanying drawing.

BRIEF DESCRIPTION OF THE DRAWING

FIG. 1 is a side elevational view of a Fourier transform imaging microscope incorporating the present invention.

FIG. 2 is a front elevational view of the microscope shown in FIG. 1 looking along the line 2—2 of FIG. 1.

FIG. 3 is a cross-sectional view taken along the line 3—3 of FIG. 1.

FIG. 4 is a cross-sectional view taken along the line 4—4 of FIG. 3.

FIGS. 5A and 5B are cross-sectional views taken along the line 5—5 of FIG. 3.

FIG. 6 is a cross-sectional view taken along the line 6—6 of FIG. 4.

FIG. 7 is a cross-sectional view taken along the line 7—7 of FIG. 6.

FIG. 8 is a cross-sectional view taken along the line 8—8 of FIG. 1.

FIG. 9 is a cross-sectional view taken along the line 9—9 of FIG. 1.

FIG. 10 is a cross-sectional view taken along the line 10—10 of FIG. 8.

FIG. 11 is a cross-sectional view taken along the line 11—11 of FIG. 8.

FIG. 12 is a cross-sectional view taken along the line 12—12 of FIG. 9.

DESCRIPTION OF THE PREFERRED EMBODIMENT

Figure 13:
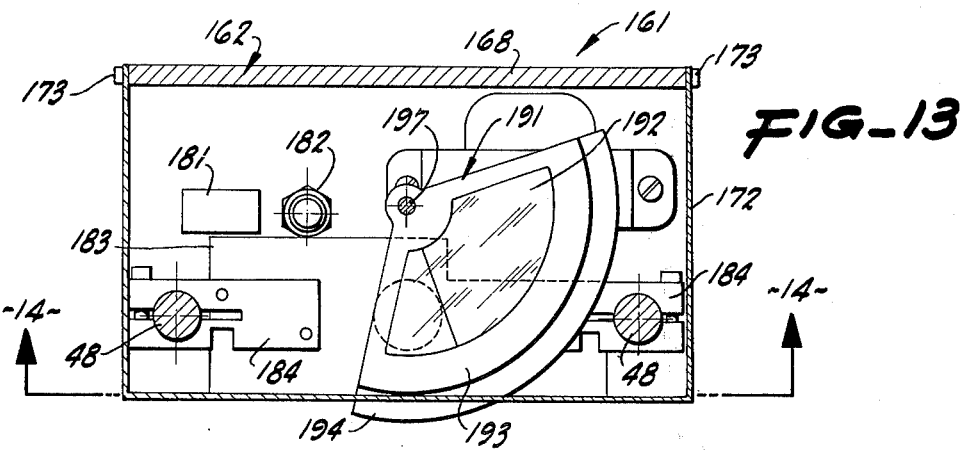
FIG. 13 is a cross-sectional view taken along the line 13—13 of FIG. 2.
Figure 14:
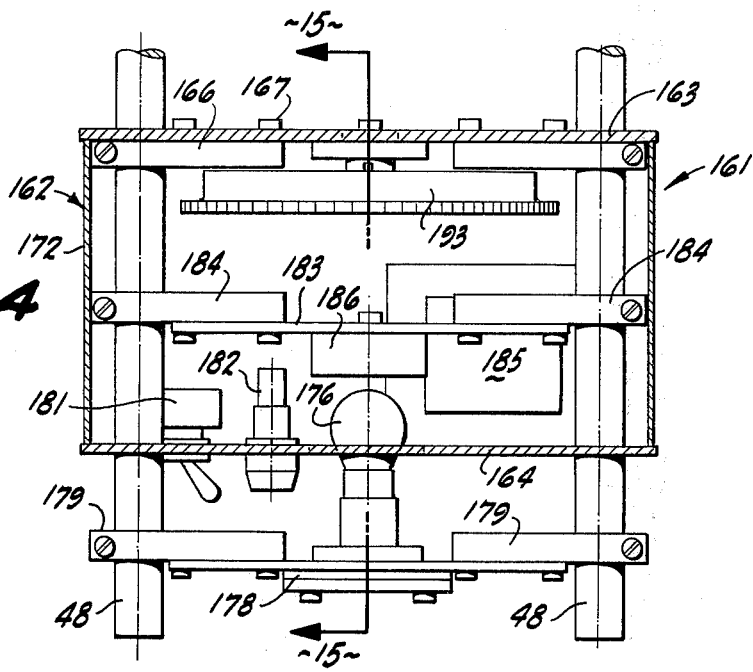
FIG. 14 is a cross-sectional view taken along the line 14—14 of FIG. 13.
Figure 16:
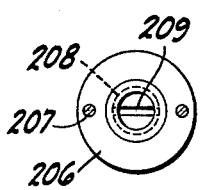
FIG. 16 is a cross-sectional view taken along the line 16—16 of FIG. 15.
Figure 15:
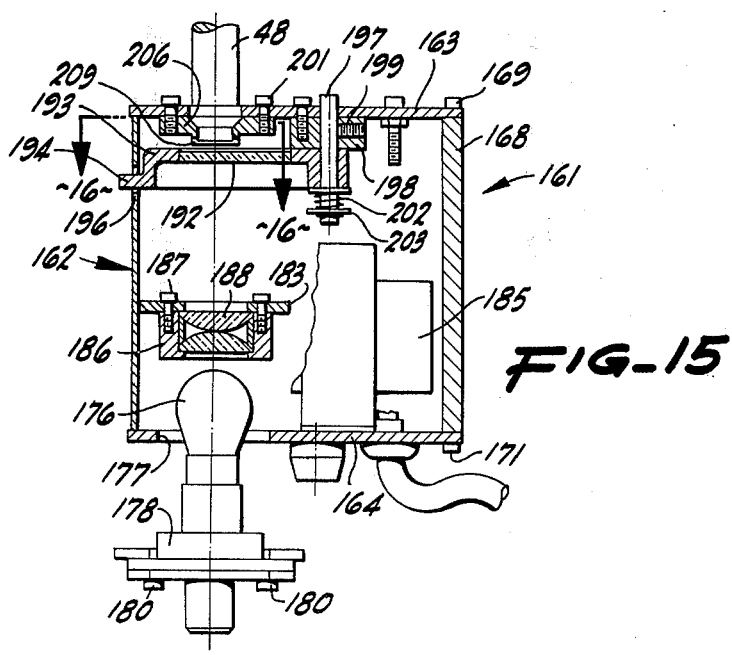
FIG. 15 is a cross-sectional view taken along the line 15—15 of FIG. 14.

The Fourier transform imaging microscope 31 is constructed in such a manner so that it can be mounted upon a table top as, for example, a table top 32 as shown on FIG. 1. The table top is at a suitable height as, for example, approximately 29 inches so that the microscope can be readily used by one sitting in a chair at the table having the table top 32 forming a part thereof. The microscope 31 includes a bracket assembly 33 which consists of a pair of spaced parallel side plates 34. A cross plate 36 is secured between the extremities of the side plates 34 by screws 37. The cross plate 36 is secured to the table top 32 by suitable means such as screws 38. The outer lower extremities of the side plates 34 are provided with recesses or notches 39 which accommodate the upper portion of the table 32. The notches 39 are sized in such a way so that the center of gravity of the microscope or instrument 31 extends inwardly over the edge of the table top 32.

The bracket assembly 33 is secured to a viewing head assembly 41. Thus, as shown, the side plates 34 are secured by screws 42 to two additional spaced parallel side plates 43 forming a part of the viewing head assembly 41. The side plates 43 are secured to spaced parallel top and bottom plates 44 and 46 by screws 47. The top and bottom plates 44 and 46 are mounted upon two circular spaced parallel rods or rails 48. These rods or rails 48 can be of any suitable materials such as ⅝ inch diameter steel rods. Clamps 49 are secured to the top and bottom plates 44 and 46 by screws (not shown) and the clamps 49 are frictionally clamped to the rods 48 by screws 51 extending through the clamps (see FIG. 5A).

Figure 20:
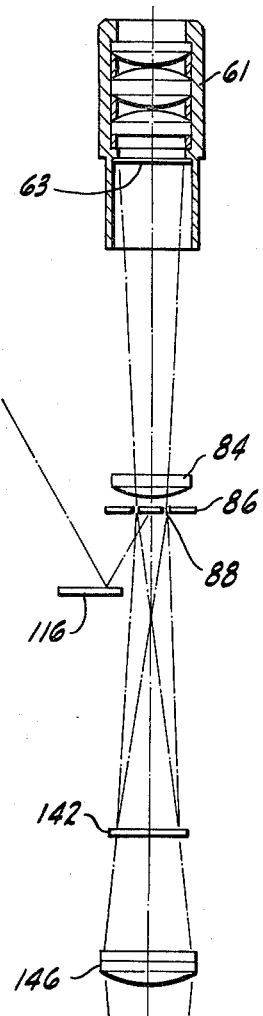
FIG. 20 is a diagrammatic illustration of the Fourier transform imaging microscope of the present invention using low power magnification.

The viewing head assembly 41 includes a sheet metal housing 52 which is secured to the top and bottom plates 44 and 46 by suitable means such as screws (not shown). A flanged collar 56 formed of a suitable material such as brass is secured to the bottom side of the top wall 44 by suitable means such as a pair of screws 57. A tube 58 formed of a suitable material such as aluminum is threaded into the collar 56 and is locked therein by a lock nut 59. A wide field eyepiece assembly 61 of a conventional type is mounted in the upper end of the tube 58 and is secured therein by a set screw 62. The eyepiece assembly 61 is provided with a reticle 63 (FIG. 20). The reticle 63 has a bullseye or an "X" in the center which permits the user to identify the same point in the object being viewed at either high or low magnification as hereinafter described.

A lens carrier assembly 66 is mounted within the viewing head assembly 41 and consists of a rod 67 which is rotatably mounted in bushings 68 and 69 mounted in the top and bottom walls 44 and 46. A handle 71 is secured to the top end of the rod 67 to permit rotation of the same by hand. A support member 72 carrying a bushing 73 having the rod 67 extend therethrough is mounted for sliding movement with respect to the rod 67. The support member 72 is adjusted vertically by a threaded adjusting rod 74 which is threaded into the member 72 and has its lower end seated in a bushing 76 carried by the bottom wall 46. The adjusting rod also extends through a bushing 77 carried by the support member 72 and also extends through a bushing 78 carried by the top wall 44. An adjusting knob 79 is mounted on the upper end of the adjusting rod 74 to permit rotation of the rod 74 to shift the position of the support member 72 relative to the rod 67. A member 81 is slidably mounted upon the rod 67 and rests upon the support member 72. The member 81 is provided with a hole 82 over which there is mounted an objective lens assembly 83 with a non-magnifying lens 84 of a conventional type such as a double convex, preferably achromatic lens. A mask 86 is secured to the member 81 immediately below the hole 82 by suitable means such as screws 87. The mask 86 has provided therein a pair of spaced parallel slits 88 of a suitable size such as 1 mm by 10 mm.

Another conventional objective lens assembly 89 is carried by the lens carrier assembly 66. This lens assembly 89 is supported by screws 91 extending through a flexible depending member 92 (see FIG. 6). The depending member 92 extends through an "L" shaped slot provided in the bottom plate 46 and is secured to the member 81 by screws 94. Means is provided for adjusting the lateral position of the lens assembly 89 with respect to the rod 67 and consists of a forked member 96 engaging the rod 67 (see FIG. 7) and secured to the depending member 92 by screws 97. A collar 98 is slidably mounted on the rod 67 of the forked member 96 and has a screw 98 threadedly mounted therein. The screw 99 extends through the depending member 92 and is secured in the desired position by nuts 101.

Means is provided for selectively retaining either one of the two objective lenses 83 and 89 in line with the eyepiece assembly 61 and consists of a yoke-like member 106 that is generally rectangular and which is provided with a large rectangular opening 107 therein (see FIGS. 5A and 5B). One end of the member 106 is pivotally mounted upon a pin 108 carried by the member 81. The shaft 67 extends through the opening 107. Spring means 109 is provided engaging one end of the yoke-like member 106 by extending through a hole 111 provided in the yoke-like member and having the other end extending through a hole 112 provided in an anchor member 113 which is disposed in an annular slot 114 provided in one of the support rods 48.

A mirror 116 is mounted on the top side of the bottom plate 46 which makes it possible to permit the viewer to see the light which is hitting the double slit and the image that is being formed thereon and to see that it is properly aligned with the double slit. A hole 117 has been provided in the top plate 44 to permit viewing of the mirror 116.

A stage assembly 121 is mounted on the two support rods 48 below the viewing head assembly 41 as shown in FIGS. 1 and 2. The stage assembly 121 consists of clamps 122 which are secured to the support rods 48. A planar table or plate 123 is secured to the clamps 122 by screws 124. A bushing 126 is rotatably mounted in the table 123 and is secured to a plate 127 mounted on the table 123 by suitable means such a screws 128. A flat leaf spring 129 is disposed between the outer flange of the bushing 126 and the table or plate 123 to provide some frictional engagement between the parts so that the bushing 126 will remain in a predetermined angular position on the table 123. Means is provided for limiting travel of the plate 127 between two angular positions as, for example, 48° by vertical pins 129 and 131 and provided in the table 123 and a pin 132 extending into the plate 127 (see FIG. 8).

A conventional X—Y stage 133 is mounted upon the plate 127 and is provided with a bar 134 to which there is secured a sample holder 136 by screws 137. The stage 133 is provided with a control knob 138 for shifting the sample holder 136 along the X axis and a control knob 139 for shifting the sample holder 136 along the Y direction. Two large slots 141 are provided on opposite sides of the sample holder 136 to facilitate grasping of a striped dichroic filter 142 carried by the sample holder. The objective lenses 84 and 89 are positioned to be parfocal and coaxial such that they both are focused on the surface of the filter 142 with the fields of both centered on the same point of the surface 142.

An imaging lens assembly 146 is mounted on the support rods 48 below the stage assembly 121 and consists of a pair of split clamps 147 which are secured to the support rods 48. A plate 148 is carried by the clamps 147 and is secured thereto by screws 149. A lens mount 151 is movably mounted on the plate 148 and is pivoted on the pin 152 carried by the plate 148 (see FIG. 12). A lens assembly 153 is mounted in the lens mount 151 and is of a conventional type such as a double convex, preferably achromatic lens. The lens mount 151 is held in place by a pair of screws 154 provided on opposite sides of the pin 152. With this arrangement, by loosening the screws 154, the lens mount 151 and the lens assembly 153 carried thereby can be shifted sideways a small amount and then locked in the desired position by fastening the screws 154.

A monochromator 161 is mounted on the support rods 48. It consists of a housing 162 formed of top and bottom plates 163 and 164. The top plate 163 is mounted on the rods 48 by clamps 166 which are secured to the top plate by screws 167. A thick metal back piece 168 is provided which is secured to the top plate by screws 169. The bottom plate is secured to the back piece 168 by screws 171. A U-shaped sheet metal member 172 is secured to the back plate 168 by screws 172 (see FIG. 13) to form the remainder of the housing.

A light source in the form of a high intensity lamp 176 is provided within the housing 162 and extends downwardly through an opening 177 provided in the bottom wall 164. The lamp is mounted in a lamp base 178 which is carried by a pair of clamps 179 secured to the support rods 48. Screws 180 make it possible to adjust the base 180 to position the lamp 176 so that it is centered relative to the condensing lenses 188. Means is provided for supplying power to the lamp 176 and consists of an on-off switch 181, a fuse 182 and a transformer 185 mounted on the bottom plate 164. The transformer is utilized for reducing the voltage from 115 volts AC to 12 volts AC for the high intensity light 176. A lens mount 186 is secured to the plate 183 by screws 187. A plate 183 is secured by clamps 184 to the support rods 48. Condensing lenses 188 are carried by the lens mount 186 and are of a suitable type such as convex condensing lenses having a focal length of 33 mm and a diameter of 23 mm.

A continuously variable filter assembly 191 is mounted within the monochromator housing 162 and consists of a continuously variable filter segment 192 of the type manufactured and sold by Optical Coating Laboratory, Inc. of Santa Rosa, California and described in U.S. Pat. No. 3,442,572. The filter segment 192 covers 90° and extends from a wavelength of 400 to 700 nanometers. It is mounted in a holder 193 which is also in the form of a segment. The holder 193 is provided with a knurled flange 194 which extends outwardly through a slot 196 provided in the side wall of the sheet metal member 172. The holder 193 is rotatably mounted upon a pin 197 which is retained within a mounting block 198 by a set screw 199. The block 198 is secured to the top plate 163 by screws 201. A spring 202 mounted on the pin 197 engages the lower side of the holder 193 and is held in place by a snap ring 203 mounted on the rod 197.

A mounting member 206 is secured to the top plate 163 by screws 207 and carries a member 208 having a single slit 209 therein. The slit 209 can have a width ranging from 0.9 to 1.1 but preferably has a width of 1.0 and a length of approximately 12 mm.

Operation and use of the Fourier imaging microscope can now be briefly described as follows. In using this microscope, the relative positions of the optical elements are adjusted in the following manner. The viewing head assembly 41 is fixed at the upper ends of the support shafts or rods 48. The monochromator housing 162 and the slit imaging lens 146 are positioned so that the imaging lens 146 is half-way between the monochromator slit 209 and the double slits 88 such that it forms a sharp image of the monochromator slit on the face of the double slit aperture. The focusing knob 79 is adjusted so that the swivel arm or member 81 upon which the double slit is mounted is approximately one-half an inch from its bottommost position. The stage assembly 121 is adjusted on the rods 48 so that the distance between the top of the test part and the double slit aperture is approximately 185 mm. The condenser lens mounting plate 183 within the monochromator housing is adjusted so that its distance from the monochromator slit 209 is approximately 50 mm.

The power can then be turned on to energize the lamp 176. The condensing lenses 188 concentrate the light from the lamp 176 onto the monochromator slit 209. The light, before reaching the slit 209, passes through the continuously variable filter 209. The lamp 176 is adjusted and aligned so that its forms the sharpest image and is parallel to the slit by adjusting the clamps 179 longitudinally of the rods 48 and adjusting the lamp holder 178 which can be rotated and centered by loosening the adjusting screws 180.

The wavelength of the light transmitted by the continuously variable filter 192 varies from point to point along the filter covering the visible range of 400–700 nanometers. Only a narrow spectral range of approximately 20 nanometers is transmitted at any one position of the filter and a relatively monochromatic beam of light emerges from the slit 209. The wavelength of the beam is varied by moving the filter 192 in relation to the slit 209. The slit imaging lens 146 transmits the light beam from the slit 209 and forms an image of the monochrometer slit 209 on the mask 86. The slit image will form in the middle between the slits 88 in the mask 86 and no light will pass through the system to the observer.

Figure 17:
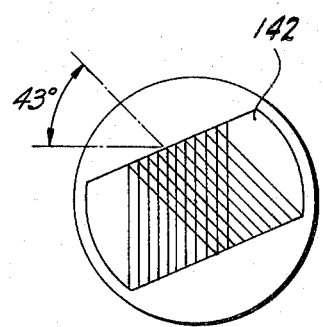
FIG. 17 is a front elevational view of a typical striped dichroic filter used in a color television camera.

A typical striped filter 142 to be examined in the microscope or instrument is shown on FIG. 17. The filter 142 is generally of the type described in U.S. Pat. No. 3,771,857. It has two sets of dichroic stripes of different colors crossing at an angle of 47°. The stripes and the spaces between stripes are of equal width of 0.03 mm. The striped filter 142 is placed in the sample holder 136 and in the light beam. Placing the striped filter 142 in the beam will cause the slit image to break up into a multiplicity of images by diffraction.

The filter 142 is oriented with one set of the stripes perpendicular to the slit 209. When this is done, although both sets of stripes will cause diffraction of the beam both separately and in combination, any diffraction effect by the first set of stripes perpendicular to the slit 209 will only result in elongation and lengthwise offset of the slit images.

Figure 18:
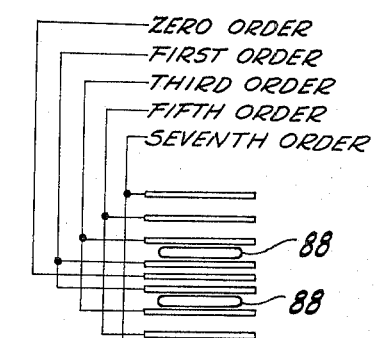
FIG. 18 shows the diffracted slit image that is the Fourier transform image of the stripe pattern and the location of the pair of slits.

The splitting of the slit image into separate images corresponding to different diffraction orders as shown on FIG. 18 is entirely the result of diffraction by the second set of stripes that are not perpendicular to the slit 209. The second set of stripes will in this case form an angle of 43° with the slit, and the effective width in the stripes and spaces in a direction perpendicular to the slit equals the actual stripe and space width divided by cosine of 43°.

A zero order image is formed by the rays that are not deflected by the striped filter 142. The deflection angle alpha ($\alpha$) for a beam of light with a wavelength of 0.55 micron (green light) perpendicular to the striped filter 142 is shown on FIG. 19. The second order image is formed where the path difference between two rays at the edges of a stripe pair (a colored stripe plus a space) is equal to two times the wavelength of the light (or equal to ten times the wavelength of light over the width of five stripe pairs as shown on FIG. 19). The deflection angle alpha of the rays that form the second order slit image are calculated from:

$$\sin \alpha = \frac{2 \times \text{wavelength}}{\text{width of stripe pair}} \text{cosine } 43°$$

$$\sin \alpha = \frac{.0011}{.06} \; 0.731 = 0.0134$$

$$\alpha = 0.77°$$

With the distance between the striped filter 142 and the slit image set at 185 mm, the distance from the zero order to the second order diffraction image will be:

$$185 \times \tan 0.77° = 2.5 \text{ mm}$$

Another second order diffraction image is formed symmetrically on the other side of the zero order image. The location of the other order diffraction images that together form the Fourier transform image of the stripe pattern can similarly be calculated.

Figure 19:
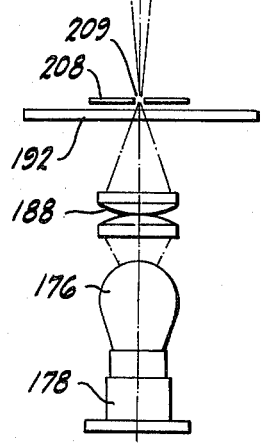
FIG. 19 is a cross-sectional view showing the diffraction effect of the stripe pattern.

A characteristic of the Fourier transform image of a stripe pattern where the stripes and the spaces are of equal width is that the even order diffraction images except the zero order are absent. FIG. 19 shows the slits 88 placed at the location of the second order diffraction image. The striped filter 142 is viewed through the slits 88 by the objective lens 84 and the eyepiece 61. Any area of the striped filter where the stripe pattern is perfect with equal width of stripes and spaces will show dark in the field of view because they produce no energy in the even and specifically the second order diffraction images where the slits 88 are located. Any area of the striped filter where the stripe pattern is not perfect will produce energy in the second order diffraction image and will, therefore, be clearly visible on the dark background. Both localized defects like stripe breaks and distributed irregularities in the stripe pattern will show up.

The wavelength of the light through the microscope can be varied by rotating the circular variable filter 192. Varying the wavelength will cause the diffraction images to move, further away from the zero order image for longer wavelengths, close in for shorter. The highest order diffraction images will move the most. It has been found that the slits 88 can be made wide enough to accommodate the second order diffraction images over the whole wavelength range of interest without encroaching on the first or third order diffraction images.

Differences in colorimetry of the colored stripes too small to be readily observed by other methods become very visible through the Fourier transform imaging at certain wavelengths. The ability to vary the wavelength not found in the laser type Fourier transform imaging system makes this Fourier transform imaging microscope especially well suited for examining the colored striped filter.

Two viewing slits 88 are shown on FIG. 6. It has been found that adequate energy for viewing can be obtained through a single slit. A single slit can easily be moved to other locations in the Fourier transform image. This may be done by moving the mask 86 with a single slit 88, but may also be done by moving the slit imaging lens 146 sideways which causes the Fourier transform image to move in relation to the slit.

Stripe patterns where the width of the stripes and the spaces between the stripes are equal will produce Fourier transform images where the even order diffraction images are absent. Even a very small difference in width of the stripes and the spaces will cause energy to appear in the even order diffraction images. Variation in stripe width will, therefore, be very visible when viewed in the microscope through slit 88 positioned at the second order diffraction image.

Stripe patterns with unequal width of stripes and space between stripes will produce Fourier transform images where there may be energy in all of the diffraction orders, odd and even. There will, however, be no energy present between the different order diffraction images if the stripe pattern is perfect.

Areas of the striped filter 142 where the stripe pattern is flawless will appear dark when seen in the microcope through the slit 88 positioned between diffraction images, for instance, between the second order and the third order diffraction images. Areas of the striped filter 142 where the stripe pattern is defective will cause energy to appear in the Fourier transform image between diffraction orders and will, therefore, be visible in the microscope. Defects like breaks in the stripes and bridges between stripes will show very clearly while variation in stripe width will not show in this case.

The slit used to fit between diffraction orders may need to be narrower than the slit used to accommodate a diffraction image and it may also be necessary to adjust the position of the slit when the wavelength is varied.

Certain orders of diffraction images may be absent for specific ratios of width of stripes and spaces. The third order diffraction image will, for instance, be absent when the stripes are twice as wide as the spaces or vice versa. Both localized flaws and variations in stripe width can be seen in the microscope through the slit 88 positioned at the third order diffraction image in this case.

The zero order diffraction image will in certain cases be absent in filters with dichroic stripes where the stripes and the spaces are of equal width. That happens when a wavelength is chosen that is transmitted by the dichroic stripes and which produces a phase difference of 180° between the light that goes through the dichroic stripes and the light that goes between the stripes. The striped filter will appear dark as seen in the microscope through the slit 88 when the slit is positioned at the zero order diffraction image. Areas of the striped filter where the thickness of the dichroic coating varies and where the phase difference, therefore, is not 180° will stand out.

Referring now more specifically to the operation of the microscope or instrument, let it now be assumed that the various optical elements are arranged as shown in FIG. 20. In this position, the magnification is approximately 12 times and the field of view is 22 mm in diameter which is large enough to cover the entire filter 142. As hereinbefore explained, light from the lamp 176 passes through the condensing lens 188, the circular variable filter 192 and through the single slit 209 and then through the imaging lens assembly 146. The imaging lens assembly 146 forms an image of the monochromator slit 209 at the double viewing slits 88 where it can be viewed through the eyepiece assembly 61 and the lens 84. The low power objective lens 84 is in the beam. Focusing is accomplished to obtain the sharpest image by rotating the knob 79. The low power objective lens 84 is centered so that the center of the rotation of the stage 133 is in the center of the field of view. The correct setting is obtained when a point seen in the bullseye of the low power objective does not move when the stage is rotated.

While observing the slits 88 through the mirror 166, the slit imaging lens assembly 146 is shifted sideways so that the first and second order images are between the slits 88 and the second order images fall in the slits. The filter 142 is rotated until a pattern of lines is seen through the eyepiece. This is accomplished by manually rotating the sample holder carrying the filter. After this has been accomplished, the knobs 138 and 139 are rotated to place the entire effective area of the filter in the field of view. The rotatable table 127 is then shifted between the two extreme positions as is dictated by the pins 129 and 131 so that both sets of lines can be examined under the microscope. The examining of the filter 142 under the low power lens 84 as shown in FIG. 20 makes it possible to determine whether distributed defects appear in the filter.

If there are localized defects which it is desired to examine more closely, the handle 71 is operated to move the low power lens 84 and the slits 88 out of the beam and to move the high power lens 89 into the beam as represented by the changes in FIGS. 5A and 5B and FIGS. 20 and 21. The mechanism provided travels over center so that it remains in either one of the two positions represented by FIGS. 5A and 5B.

Figure 21:
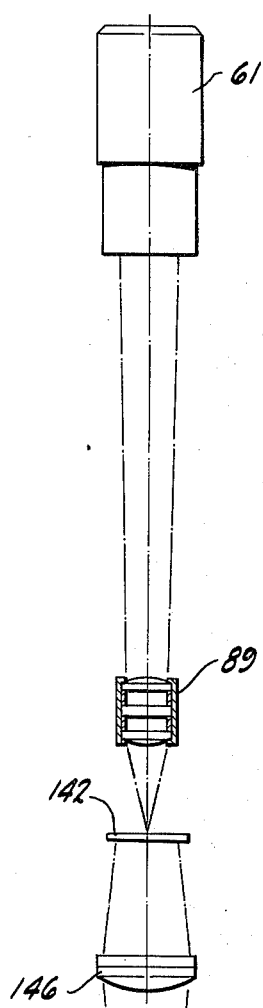
FIG. 21 is a schematic illustration showing the use of the same microscope using high power magnification.

As soon as the high power lens is brought into the beam as shown in FIG. 21, it should be possible by examining the local defect through the eyepiece 61 to ascertain whether or not the defect being examined is a line break or bridge between the lines or possibly a dust particle or a defect in the glass substrate itself. After the localized defect has been examined, it is possible to again switch back to the low power magnification so that the whole filter can be examined. Thus, it is possible to examine the filter 142 for distributed effects and also for any localized defects.

It should be appreciated that in locating or positioning the slots 88, the slots are positioned in areas where low energy is present. In order to ascertain defects, it is desirable to subdue the images on the lines themselves and to enhance the irregularities in the stripes. This is accomplished by placing the slits in area of the Fourier transform image where the diffraction effect of the stripe pattern produces minimum energy and blocking or suppressing the areas of the Fourier transform image where the diffraction effect of the stripe pattern produces maximum energy.

Although it has been pointed out that it is desirable to place the slits at a second order image, it also should be pointed out that, in addition to placing the slits at other even ordered images, it is possible to locate the slits between the orders. This may require a more narrow slit on the monochromator to make the slit image more well defined. It also may be necessary to work with narrower slits for the double slits 88.

Thus, it can be seen that the basic principle taught with the present invention is to ascertain the diffraction image which is formed by the part being examined and to isolate the diffraction orders that have the lowest possible energy. In this way, the pattern itself provides minimum energy, whereas the defects provide energy throughout the space and are not limited to any location of the separate orders.

Also, in utilizing the present invention, it is desirable that the pattern being examined be highly repetitive so that the diffraction image will be well defined. In such a situation it would be necessary to obtain a diffraction image to utilize coherent light such as produced by a laser beam to obtain Fourier transform imaging. With the present microscope, it has been possible to eliminate such costly elements in the microscope and to provide a relatively simple device for examining striped dichroic filters.

Both localized flaws and distributed defects in the stripe pattern are readily detected with the present Fourier transform imaging microscope. A substantial area of the striped filter, generally the whole usable aperture of the filter can be seen within the field of view of the Fourier transform imaging microscope. Even minute flaws in the stripe pattern are clearly visible as bright spots in the field of view. The resolving power of the Fourier transform imaging microscope is quite low, not just because of its low magnification, but because of the diffraction limits imposed by the narrow aperture of the viewing slits 88. The nature of an observed flaw generally cannot be determined in the Fourier transform imaging microscope. It is necessary to move the observed flaw to the center of the field indicated by the bullseye or *x* of the reticle 62 using the *x—y* stage 133 and switch to the second objective lens 89 by operating the lever 71 to see if the flaw is a break in a stripe, a foreign particle, a scratch, etc. The instrument works as an ordinary microscope without Fourier transform imaging when the second objective lens 89 is used.

From the foregoing it can be seen that the Fourier transform imaging which is obtained by utilizing the microscope of the present invention brings out irregularities in stripe patterns that are not readily visible or measurable by other methods. It has been found that the same irregularities also are the ones that are emphasized when a striped filter is used in a color television camera. The reason for this is that the spatial frequency filtering imposed by the Fourier transform imaging is equivalent to the electronic signal filtering in the color television camera. The Fourier transform imaging optically filters out the spatial frequency corresponding to the striped pattern itself and the signal processing is the color television camera electronically filters out the signal frequency produced by scanning across the stripes so that the stripes themselves will not be visible in the transmitted television picture.

It, therefore, can be seen that the microscope of the present invention is particularly effective for the evaluation of striped filters for use in color television cameras whether they be of the cross stripe pattern type described in U.S. Pat. No. 3,771,857 or of the parallel abated stripe type disclosed in copending application Ser. No. 305,692, filed on Nov. 13, 1972.

In addition, the microscope can be used for evaluation of the photographic masters utilized in the production of the striped filters.

The miroscope is shown working with light transmitted through the striped filter. By a simple modification, it can be made to work with the light reflected off the striped filter. It can then be used for the evaluation of striped filters that have been mounted as faceplates on vidicon image tubes.

I claim:

1. In a Fourier transform imaging microscope for examining parts carrying a repetitive stripe pattern, a source of light, means forming a slit through which said light passes, means including said part carrying the repetitive pattern for forming a Fourier transform image of the slit after the light beam passes through the part, means for suppressing the image of the stripe pattern of the part and for enhancing the defects in the stripe pattern including at least one slit having an orientation parallel to the first named slit, and means for positioning the slit in the Fourier transform image.

2. A microscope as in claim 1 wherein said at least one slit is positioned in the Fourier transform image where there is low amount of information of the stripe pattern.

3. A microscope as in claim 2 wherein said Fourier transform image has a plurality of orders and wherein the at least one slit is positioned at a location of an even order of the image.

4. A microscope as in claim 3 wherein the at least one slit is positioned at the second order of the image.

5. A microscope as in claim 2 wherein the Fourier transform image is comprised of a plurality of orders and wherein the at least one slit is positioned between the orders.

6. A microscope as in claim 1 wherein said at least one slit is in the form of a pair of spaced parallel slits.

7. A microscope as in claim 1 together with means for selectively changing the color of the light beam supplied from the first named slit.

8. A microscope as in claim 7 wherein said means for selectively changing the color of light is a continuously variable filter.

9. In a Fourier transform imaging microscope for examining parts having a substantially transparent substrate and carrying a repetitive stripe pattern, means for holding the part, a source of light, means forming a slit through which light from the source passes, means for forming an image of the slit and for projecting the same through the part to provide a Fourier transform image of the repetitive stripe pattern carried by the part, slit means for suppressing the image of the stripe pattern and for enhancing the defects in the stripe pattern and means for positioning the slit means so that the slit means is positioned so that at least one slit therein is positioned in the Fourier transform image in a region which carries little information on the stripe pattern so that substantial information is provided with respect to defects in the stripe pattern while suppressing the image of the stripe pattern.

10. A microscope as in claim 9 together with means for moving said slit means for suppressing the image of the stripe pattern out of the beam of light and means for viewing the part under a high power magnification lens to make it possible to analyze local defects in the part.

11. A microscope as in claim 9 together with low power magnification means for viewing said part.

12. A microscope as in claim 11 wherein said low power magnification means has a field of view which is great enough to substantially encompass the entire part being examined.

13. A microscope as in claim 10 wherein said part carries a plurality of repetitive stripe patterns and wherein said stripe patterns are arranged at an angle with respect to each other together with means for moving the part so that at least one set of the striped parallel lines is perpendicular to the means forming a slit through which the light beam passes.

14. In a Fourier transform imaging microscope for examining parts having a substantially transparent substrate and carrying a repetitive stripe pattern, means for holding the part, a source of light, means forming a slit through which light from the source passes, means for forming an image of the slit and for projecting the same through the part to provide a Fourier transform image of the repetitive stripe pattern carried by the part, an eyepiece assembly for viewing the part, first and second objective lenses, one having a low power magnification, the other having a high power magnification for viewing the part, and slit means associated with the low power magnification means for suppressing the image of the stripe pattern and for enhancing the defects in the stripe pattern.

15. A microscope as in claim 14 together with means for adjusting the position of the slit means so as to position the same in the Fourier transform image at a location which carries relatively little information of the stripe pattern.

16. A microscope as in claim 14 wherein said means for carrying the part includes an X—Y stage.

17. A microscope as in claim 14 together with means for selectively moving the low power lens and slit means into the field of view of the eyepiece assembly or alternatively moving the high power magnification means into the field of view of the eyepiece assembly.

18. A microscope as in claim 14 together with means for selecting the wavelength of the light beam passing through the part.

19. A microscope as in claim 18 wherein said means for selecting the color includes a continuously variable filter.

20. A microscope as in claim 14 wherein said part carries a plurality of repetitive stripe patterns in which the stripe patterns extend at an angle with respect to each other and means for adjusting the part carrying the stripe pattern so that only one of the stripe patterns at a time is examined under the microscope.

21. In a method for examing parts carrying a repetitive stripe pattern to ascertain what defects are in the stripe pattern, the steps of providing a beam of light passing through a slit, forming an image of said slit and passing the same through said part to provide a Fourier transform image of the stripe pattern of the part, suppressing areas of the Fourier transform image where the diffraction effect of the stripe pattern produces maximum energy, viewing the part by using areas in the Fourier transform image where the diffraction effect of the stripe pattern produces minimum energy to thereby enhance the discernability of the defects in the striped pattern of said part.

22. A method as in claim 21 together with the step of utilizing slit means for suppressing the image of the stripe pattern and enhancing the defects in the stripe pattern.

23. A method as in claim 22 wherein the slit means is positioned in the Fourier transform image in a location where there is little information of the stripe pattern.

24. A method as in claim 22 wherein the slit means is positioned in an even order of the stripe pattern.

25. A method as in claim 22 wherein the slit means is positioned at the second order of the stripe pattern.

26. A method as in claim 22 wherein the slit means is positioned between the orders of the stripe pattern.

27. A method as in claim 22 together with the step of selectively varying the wavelength of the light beam passing through the part.

28. A method as in claim 21 wherein the part carries a plurality of stripe patterns extending at an angle with respect to each other and wherein each of the stripe patterns is examined successively by moving the part so that only one of the stripe patterns is analyzed at a time.

29. A method as in claim 21 together with the step of first examining the Fourier transform image of the stripe pattern to ascertain distributed defects and thereafter examining the pattern to ascertain localized defects.

* * * * *